United States Patent
Kremerman (10) Patent No.: US 10,569,191 B2
(45) Date of Patent: Feb. 25, 2020

(54) SHORT DISTILLATION HEAD COMPRISING A VERTICAL TUBE FILLED WITH A KEY

(71) Applicant: Elliot Kremerman, Los Gatos, CA (US)

(72) Inventor: Elliot Kremerman, Los Gatos, CA (US)

(*) Notice: Subject to any disclaimer, the term of this patent is extended or adjusted under 35 U.S.C. 154(b) by 38 days.

(21) Appl. No.: 16/458,439

(22) Filed: Jul. 1, 2019

(65) Prior Publication Data

US 2019/0321747 A1  Oct. 24, 2019

(51) Int. Cl.
| | | |
|---|---|---|
| *B01D 5/00* | (2006.01) | |
| *B01D 3/12* | (2006.01) | |
| *B01D 3/32* | (2006.01) | |
| *B01L 3/00* | (2006.01) | |

(52) U.S. Cl.
CPC .............. *B01D 3/32* (2013.01); *B01D 5/009* (2013.01); *B01D 5/0051* (2013.01); *B01D 5/0063* (2013.01); *B01D 3/12* (2013.01); *B01D 5/006* (2013.01); *B01L 3/56* (2013.01); *B01L 3/561* (2013.01); *B01L 3/563* (2013.01); *B01L 3/569* (2013.01)

(58) Field of Classification Search
CPC ........ B01D 3/12; B01D 5/006; B01D 5/0063; B01L 3/08; B01L 3/56; B01L 3/561; B01L 3/563; B01L 3/565; B01L 3/569
See application file for complete search history.

(56) References Cited

U.S. PATENT DOCUMENTS

| | | |
|---|---|---|
| 1,418,691 A | 6/1922 | Anders |
| 2,383,377 A | 8/1945 | Evans |
| 2,427,142 A | 9/1947 | Hornbacher |
| 2,468,872 A | 5/1949 | Goldsbarry |
| 2,701,789 A | 2/1955 | White |
| 3,240,682 A | 3/1966 | Gordon |
| 3,334,025 A | 8/1967 | Reid |
| 3,334,966 A | 8/1967 | Shepherd |
| 3,397,115 A | 8/1968 | Tobey |
| 3,607,662 A | 9/1971 | Glover |
| 3,736,234 A | 5/1973 | Miyamoto |
| 3,812,010 A | 5/1974 | Nitsch |

(Continued)

OTHER PUBLICATIONS

Górak, Andrzej Schoenmakers, Hartmut. (2014). "Distillation: Operation and Applications"—9.1 Short path distillation. Elsevier. Retrieved from https://app.knovel.com/hotlink/pdf/id:kt00U70S61/distillation-operation/separation-principle (Year: 2014).*

*Primary Examiner* — Jonathan Luke Pilcher
(74) *Attorney, Agent, or Firm* — Michael J. Feigin, Esq.; Feigin and Fridman LLC (57) ABSTRACT

A distillation head of embodiments of the disclosed technology has a vertical tube which extends to and partially through a fraction collector. The vertical tube is mostly filled with a distillation key which is attached to a top side of the fraction collector and extends downwards through the vertical tube without coming into contact with same. A class housing or shell surrounds the vertical tube, which in turn, surrounds the distillation key or, at least a majority of each while the vertical tube extends past an area circumscribed by the shell and the distillation key extends past an area circumscribed by the vertical tube in some embodiments of the disclosed technology.

20 Claims, 6 Drawing Sheets

(56) References Cited

U.S. PATENT DOCUMENTS

| | | |
|---|---|---|
| 3,837,830 A | 9/1974 | Eberhart |
| 4,081,331 A | 3/1978 | Weiss |
| 5,076,349 A | 12/1991 | Kadono |
| 5,114,567 A * | 5/1992 | DiFoggio ............. B01D 5/0063 208/323 |
| 5,156,812 A * | 10/1992 | Killough ............ B01D 11/0219 202/168 |
| 5,164,049 A | 11/1992 | Clark |
| 5,354,428 A | 10/1994 | Clark |
| 5,873,980 A | 2/1999 | Young |
| 5,885,313 A * | 3/1999 | Okamoto ............... B01D 3/085 55/315.2 |
| 5,961,787 A | 10/1999 | Persson |
| 8,709,361 B2 * | 4/2014 | Gueller .................... B01L 9/00 422/547 |
| 9,682,331 B2 | 6/2017 | Kremerman |
| 9,895,626 B2 | 2/2018 | Kremerman |
| 9,895,627 B2 | 2/2018 | Kremerman |
| D819,779 S * | 6/2018 | Kremerman ................ D23/207 |
| 10,029,188 B2 | 7/2018 | Kremerman |
| 10,279,281 B2 | 5/2019 | Kremerman |
| 2005/0002485 A1 * | 1/2005 | Matsumura ......... C07F 15/0033 378/15 |
| 2008/0128261 A1 * | 6/2008 | Balass ................. B01D 5/0012 202/176 |
| 2009/0312567 A1 * | 12/2009 | Hrnciar ............... B01J 19/0013 556/60 |
| 2015/0367250 A1 | 12/2015 | Alstin |
| 2018/0161693 A1 * | 6/2018 | Kremerman ............. B01D 3/32 |

\* cited by examiner

SHORT DISTILLATION HEAD COMPRISING A VERTICAL TUBE FILLED WITH A KEY

FIELD OF THE DISCLOSED TECHNOLOGY

The disclosed technology relates generally to distillation and, more specifically, to a short path distillation head.

BACKGROUND OF THE DISCLOSED TECHNOLOGY

Distillation or fractional distillation is carried out by heating a solid or liquid and removing gaseous vapors that are expelled therefrom. This can be done while raising the temperature, as each compound boils at a different temperature. However, when working with small amounts of starting raw material or items which have close boiling points, this can be difficult, as multiple compounds get removed simultaneously. Further, a problem can arise when the temperature throughout the distillation equipment is not constant, and some of the vapor re-condenses before being evacuated from a distillation chamber.

Thus, there is a need to find a way to distill with greater efficiency and separation of compounds, while preventing vapors from re-condensing back into the product being distilled.

SUMMARY OF THE DISCLOSED TECHNOLOGY

A short path distillation head of embodiments of the disclosed technology has a vertical tube with undulating side walls. "Undulating" is defined as curvlinearly having alternatively greater and less of a circumferential cross section in a repeating pattern. A distillation key has undulating side walls, at least in part, which correspond to the undulating side walls of the vertical tube. As such, a distance between the undulating side walls of each of the distillation key and vertical tube remain constant in some embodiments of the disclosed technology. The undulations are aligned together when following the path thereof while moving in a vertical direction in such embodiments. The distillation key fills a majority of a region of the vertical tube which has the undulating side walls.

The "distillation key" is an elongated inert structure, such as a glass structure and which can be solid, which has a most elongated extent which passes through and is spaced apart from the vertical tube. The undulations of the vertical tube and distillation key help "reject" particles being distilled, meaning that particles which are cooler or heavier than average during heated distillation can be caught on the outwardly extending portions of the undulations or other areas of the distillation equipment which hinder a direct flow of matter in an otherwise upwards direction, causing same to condense and fall downwards.

The vertical tube narrows between the undulating side walls and smooth side walls thereof in some embodiments of the disclosed technology, such a narrowing region being an area of rejection due to a horizontal wall created in some such embodiments where the narrowing occurs. "Smooth" is defined as "extending laterally in a most elongated direction" and "without noticeable undulation". Thus, the vertical tube, at a smooth portion thereof, extends directly in a top/bottom direction.

A fraction collector is surrounded by the smooth side walls in embodiments of the disclosed technology. A fraction collector is defined as, for purposes of this disclosure, "a top end of a substantially vertical or vertical pathway, the pathway extending through a length of a distinguishable vertical tube which extends to or into the fraction collector, such that the fraction collector is wider than an opening therein of vertical tube."

A side portal opens between/into each of the fraction collector and a condenser, the side portal passing through smooth side walls of the fraction collector. A bottom side of the fraction collector is vertically aligned with and continuous with a bottom side of the side portal in embodiments, such that the portal opens along the bottom side of the fraction collector and is continuous therewith. The vertical tube passes into and above this bottom side of the fraction collector creating a "lip" extending into the fraction collector. As such, material was condense and fall to the outside of the vertical tube before being able to exit into the condenser in embodiments of the disclosed technology.

The distillation key extends out of an area circumscribed by the vertical tube, e.g. further below the vertical tube, in embodiments of the disclosed technology. The vertical tube itself can extend out of an area circumscribed by (surrounded by) the an exterior shell in embodiments of the technology. The exterior shell surrounds a majority of the vertical tube, the distillation key, and all of the fraction collector in some such embodiments of the disclosed technology. The fraction collector opens into the vertical tube and the distillation key can pass straight through, from vertical to horizontal, the fraction collector. The distillation key then enters into the vertical tube. A part of the vertical tube and the distillation key extend can also extend past and outside of an area circumscribed by the exterior shell. The distillation key is attached only to the fraction collector in embodiments of the disclosed technology, namely at a top side thereof. A "majority" is defined as "more than 55%" for purposes of this disclosure.

Described another way, the short path distillation head has a hollow vertical tube, wherein a majority of a space therein is filled with a solid distillation key. The solid distillation key and vertical tube are unattached to each other. A fraction collector into which a lip of the hollow vertical tube passes therein is also present in this embodiment, wherein the solid distillation key and the hollow vertical tube each become narrow and parallel to each other at the fraction collector.

A minority end (wherein "minority" is defined as "less than 10% of a length thereof") of the solid distillation key is unencumbered (that is, unsurrounded by) by the vertical tube in some embodiments. A minority end of the vertical tube is unencumbered by a glass shell in some embodiments. A glass shell surrounds a majority of the distillation key and the vertical tube in some embodiments, the glass shell further having a curvilinear top region surrounding the fraction collector and a bellowed (curvilinear increasing cross sections) at a bottom side, opposite the top side.

Figure 3:
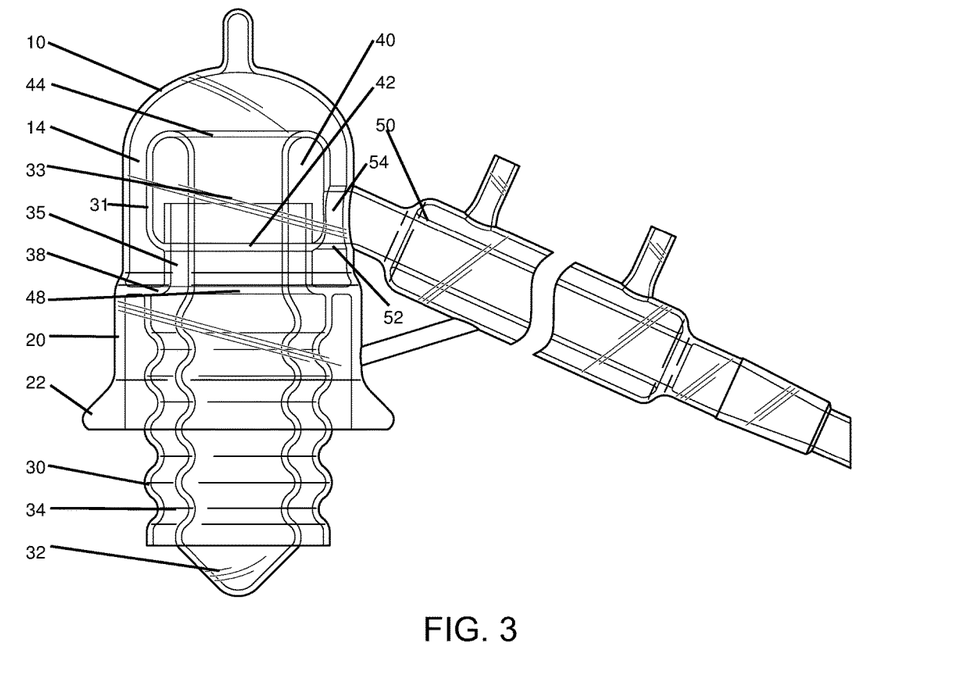
FIG. 3 shows a side elevation view of the short path distillation head of FIG. 1.

The directional descriptors used in this disclosure, such as "top", "bottom", "vertical", and "horizontal" are relative to a typical direction of use with a heat source below the opening into the vertical tube and/or directional the orientation of the device as shown in FIG. 3 on the page.

A majority of the hollow vertical tube and the solid distillation key have corresponding undulating side walls in some embodiments of the disclosed technology such that the undulating side walls of the hollow vertical tube and the solid distillation key are equidistant to one another. This is due to the undulations matching each other.

A portion of the hollow vertical tube and the solid distillation key are straight walled (that is, lack undulation and/or extend exactly vertically, within a tolerance level known in the art). A distance between the straight walls of the hollow vertical tube and the solid distillation key is less than a distance between the undulating side walls of each respective part in some embodiments of the disclosed technology. That is, in the straight walled section the hollow space between the vertical tube and distillation key (path of travel of distilled material) is narrower.

A rejection area, in the form of a horizontal wall, is formed between the straight walls and the undulating walls of the hollow vertical tube in some embodiments of the disclosed technology. A side portal which has a shared bottom side thereof with the fraction collector opens into a condenser in some embodiments of the disclosed technology. The side portal opens adjacent to and at a same height to a vertical wall of the hollow vertical tube in some embodiments of the disclosed technology, meaning that the opening of the portal is aligned with a vertical wall or lip of the vertical tube in such embodiments.

A "distillation head" is defined as a device in which vapors of a solid, liquid, or combination solid and liquid product to be distilled move upwards therein before exiting into a distribution adapter or condenser. "Distillate" refers to and is defined as the vapor, liquid, or combination thereof which exits, by way of the fraction collector, from the distillation head and is ultimately fractionally distilled into component parts, each component part having different physical properties such as a different boiling point.

Any device or step to a method described in this disclosure can comprise, or consist of, that which it is a part of, or the parts which make up the device or step. The term "and/or" is inclusive of the items which it joins linguistically and each item by itself. Any element or described portion of the devices shown can be "substantially" as such, if used in the claims in this manner. Where used, "substantially" is defined as "within a 5% tolerance level thereof."

DETAILED DESCRIPTION OF EMBODIMENTS OF THE DISCLOSED TECHNOLOGY

A distillation head of embodiments of the disclosed technology has a vertical tube which extends to and partially through a fraction collector. The vertical tube is mostly filled with a distillation key which is attached to a top side of the fraction collector and extends downwards through the vertical tube without coming into contact with same. A class housing or shell surrounds the vertical tube, which in turn, surrounds the distillation key or, at least a majority of each while the vertical tube extends past an area circumscribed by the shell and the distillation key extends past an area circumscribed by the vertical tube in some embodiments of the disclosed technology.

Figure 1:
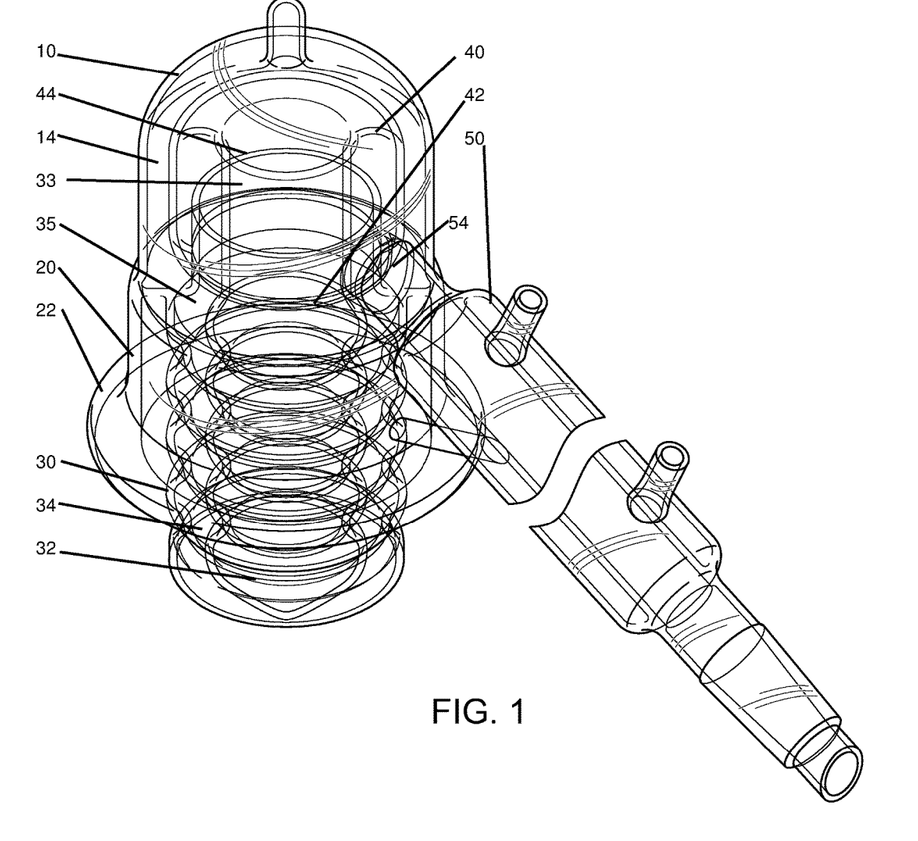
FIG. 1 shows a top and side perspective view of a short path distillation head of an embodiment of the disclosed technology.
Figure 2:
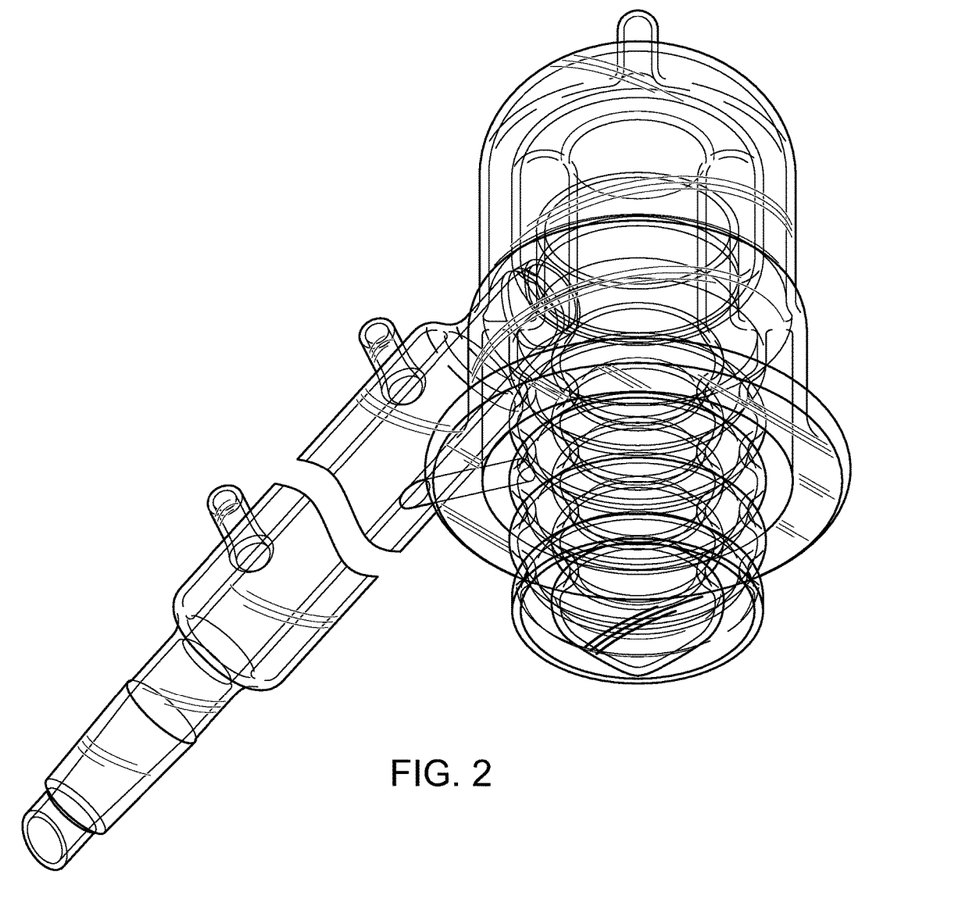
FIG. 2 shows a bottom and reverse side view of the short path distillation head of FIG. 1.
Figure 4:
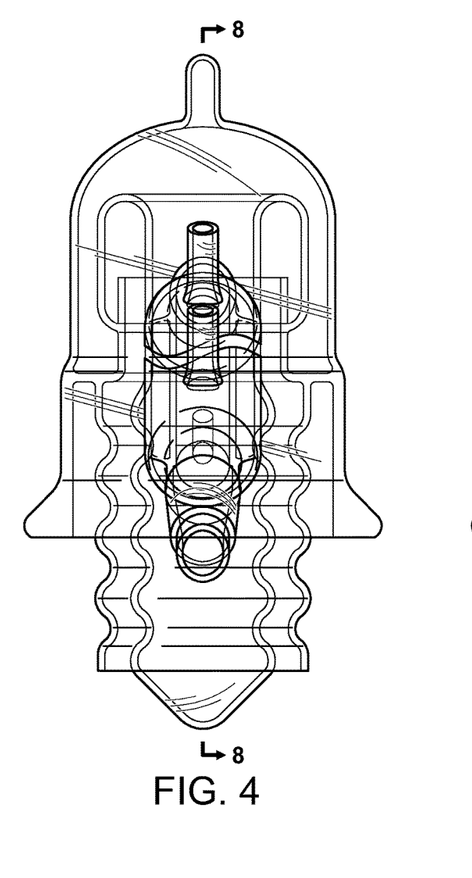
FIG. 4 shows a front elevation view of the short path distillation head of FIG. 1.
Figure 5:
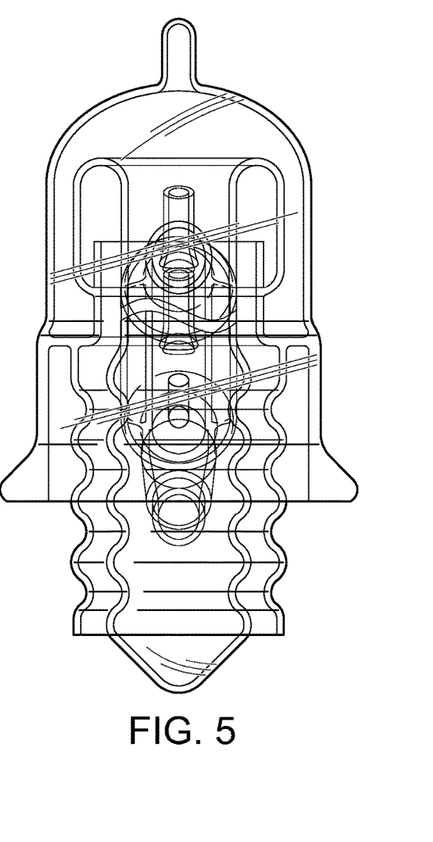
FIG. 5 shows a rear elevation view of the short path distillation head of FIG. 1.
Figure 6:
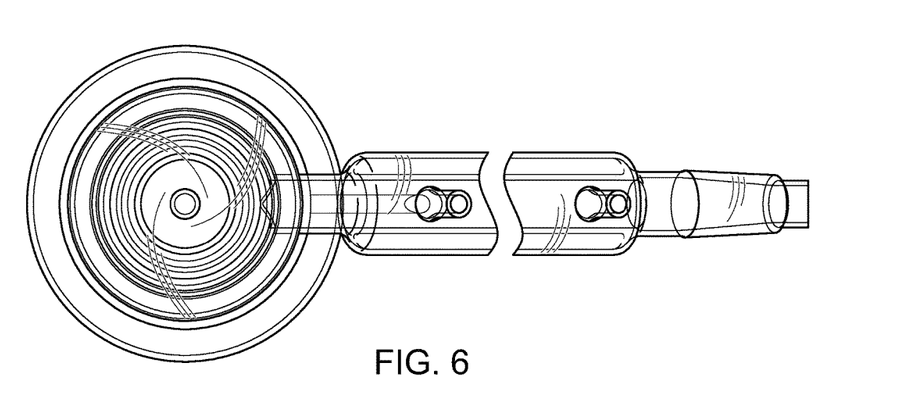
FIG. 6 shows a top plan view of the short path distillation head of FIG. 1.
Figure 7:
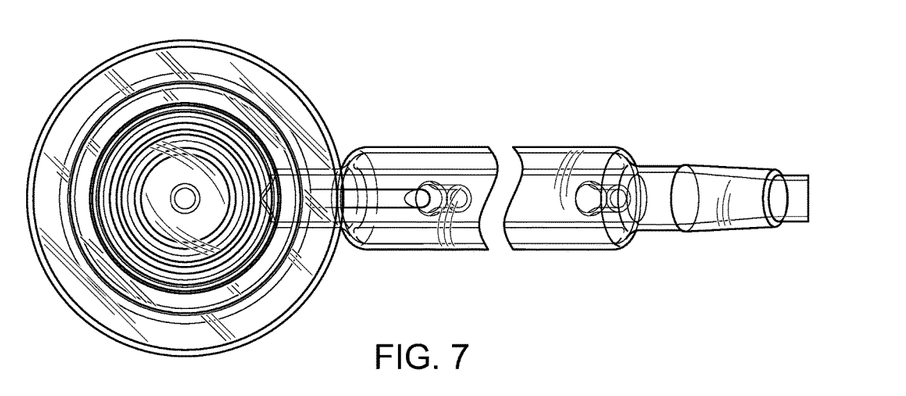
FIG. 7 shows a bottom plan view of the short path distillation head of FIG. 1.
Figure 8:
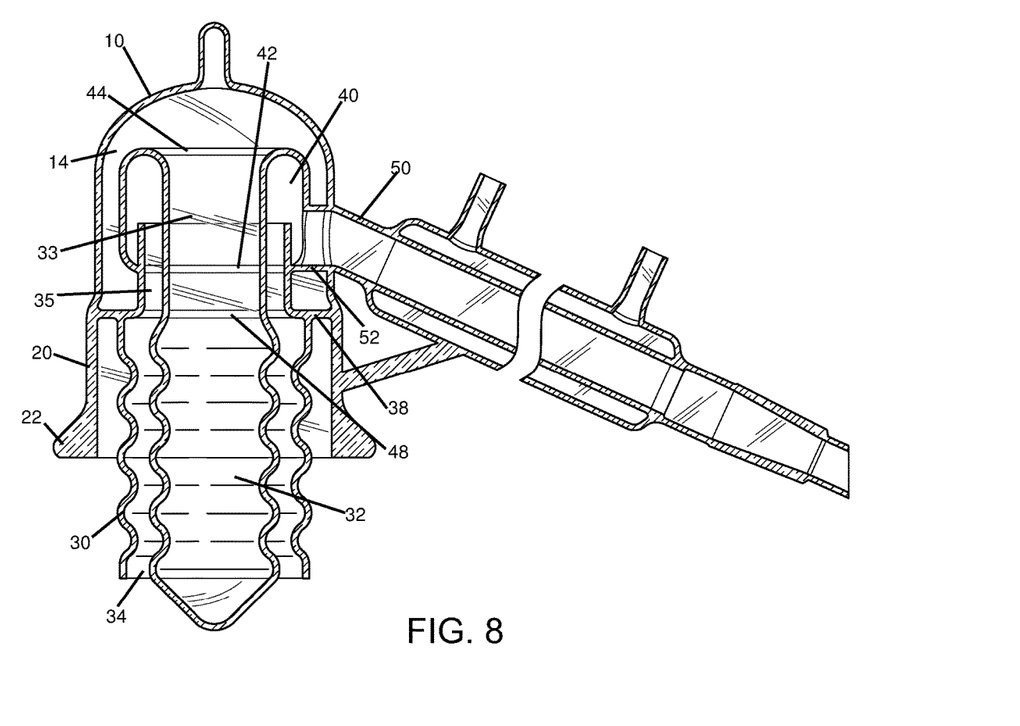
FIG. 8 shows cutaway elevation view along section line 8-8 of FIG. 4.

Embodiments of the disclosed technology will become more clear in view of the following description of the figures. Before discussing the figures, the following list of elements may be helpful in understanding the disclosed technology:

10 Exterior upper shell
14 Interior of upper
20 Exterior of lower shell
22 Bell of lower shell
30 vertical tube
31 fraction collector side
32 key
33 upper vertical tube/opening of vertical tube into space of fraction collector
34 interior of lower
35 interior of upper
38 narrowing tube
40 fraction collector
42 bottom of fraction collector
44 top of fraction collector
48 beginning of bell region
50 condenser
52 bottom of condenser
54 side portal Referring now to FIGS. 1-8 simultaneously, FIG. 1 shows a top and side perspective view of a short path distillation head of an embodiment of the disclosed technology. FIG. 2 shows a bottom and reverse side view of the short path distillation head of FIG. 1. FIG. 3 shows a side elevation view of the short path distillation head of FIG. 1. FIG. 4 shows a front elevation view of the short path distillation head of FIG. 1. FIG. 5 shows a rear elevation view of the short path distillation head of FIG. 1. FIG. 6 shows a top plan view of the short path distillation head of FIG. 1. FIG. 7 shows a bottom plan view of the short path distillation head of FIG. 1. FIG. 8 shows cutaway elevation view along section line 8-8 of FIG. 4.

An exterior shell surrounds or is on the most exterior side of the distillation head when used. The shell can be made of glass, metal, or another inert substance which can withstand being heating/or heat passing there-in from below. The shell has parts which include an exterior upper shell 10 which has a rounded top that joins an exterior lower shell 20 in a unitary structure. The lower part 20, in embodiments of the disclosed technology, is wider than the upper part and bellows outward forming a bell 22 at a lower side which is a widest portion thereof which can also have a flat bottom and be adapted to sit atop and cover/substantially seal an upper opening of a flask with a product being distilled there-below in the flask or other container.

A vertical tube 30 which extends downwards below the lowest extent of the shell 10/20/22 in embodiments of the disclosed technology extends into a flask or container which is situated there-below the distillation head. In this manner, vapors can rise into the vertical tube 30 and those which arise too fast or have too much kinetic energy will often rise outside of the vertical tube 30 and into a rest of an area of a flask. The vertical tube 30 surrounds most of a distillation key 32 in embodiments of the disclosed technology. The distillation key 30 can extend further upwards and/or downwards compared to the vertical tube 30 such that the distillation key has a bottom most extent further than that of the vertical tube in embodiments of the disclosed technology.

The vertical tube 30 has a lower section (at number 30) with an undulating side wall which moves inwards and outwards in a repeating pattern. The distillation key, where inside of the undulating side wall, has a corresponding undulating side wall in embodiments of the disclosed technology. The upper section 33 of the vertical tube has smooth or vertical sidewalls which extend directly upwards/downwards in some embodiments of the disclosed technology. The smooth/vertical sidewalls 33 extend into the fraction collector 40 and surround an opening or portal between the interior of the side walls 33 and the interior of the fraction collector. The vertical side walls 33 extend downwards until meeting a horizontal section 38 of the tube which serves as a rejection area where the vertical tube between 30 and 33 narrows. This is at a horizontal region 48 in some embodiments of the disclosed technology, where the bell region 20 begins (have a greater cross section area than an upper portion 10 of the upper shell). The horizontal region 48 can also be where the distillation key 30's undulating side walls become simply vertical or only vertical without undulation to match that of the vertical tube such that the walls between the vertical tube and distillation key remain at a constant distance.

The distillation key 32 extends from a top side 44 of the fraction collector 40 downwards and can be hollow or solid, made of glass or inert metal, or other material. The entirety of the distillation head, in fact, can be formed into a unitary piece of glassware. The distillation key 32, in embodiments of the disclosed technology, is attached to and/or in contact with only the top side 44 of the fraction collector 40. The distillation key 32 extends vertically through the fraction collector 40 and into the vertical tube, extending, in some embodiments, entirely through a length of the vertical tube and further (e.g. further upwards and downwards than the extent of the vertical tube 30/38/33). The distillation key 32 can have straight side walls at an upper portion thereof. "straight" should be understood in this context to be circumferential walls with a same cross sectional area from an end to end where the section is said to be describe as such (e.g. straight). The straight side walls become undulating side walls within the vertical tube 30 and where the vertical tube 30 side walls change from straight to undulating in embodiments of the disclosed technology, e.g. at the horizontal rejection area 38/where the shell becomes wider at horizontal portion 48.

Thus, when vapors are distilled (heated) and enter into the distillation head, they do so to the outside of the distillation key 32 and to the inside of the vertical tube 30 in a lower interior space 34 thereof while having at least some turbulent flow due to the undulating side walls which move back and forth in a lateral direction while the vapors are generally rising upwards. This causes heavier particles to fall downwards while the lighter parties rise further upwards until reaching the rejection ara at the narrowing 38 of the vertical tube which extends horizontally. The vertical tube then narrows with straight walls at an upper region 33 with interior space 35 of the upper vertical tube which extends through bottom side 42 of the fraction collector 40.

The fraction collector 40 has a bottom side 42, top side 44, and side walls 31, the side walls connecting the top and bottom sides to each other in some embodiments, having rounded edges. The bottom wall 42 has a portal through which the vertical tube 30, and more specifically, the upper section 33 of the vertical tube passes there-in creating a lip of the vertical tube which extends into an area defined by the fraction collector walls 44, 42, and 31. In this manner, rising vapors rise into the fraction collector, an area with defined top, bottom, and side walls where vapors from the vertical tube enter after exiting from the top side of the vertical tube 30.

The fraction collector 40 is fixedly attached and/or forms a unitary structure with the vertical tube 30 at a bottom side of the fraction collector, while being fixedly attached or forming a unitary structure with the distillation key 32 at a top side of the fraction collector. The shell 10/20/22 can be attached at an outside of any of the afore-described devices such as by being a solid shell which extends out from the outer edges of the vertical tube 30 and fraction collector 40 or by way of being attached at various points there-along by way of glass, metal, or other connectors.

A condenser 50 extends from a side portal 43 of the fraction collector 40. The fraction collector's bottom side 42 is continuous, in embodiments of the disclosed technology, with a bottom side 52 of the portal 54. The portal 54 passes through a side wall of the shell 10 and a side wall 31 of the fraction collector 40 and can form an attachment point between the devices internal to the shell and those which are the shell, e.g. holding the fraction collector 40 in place relative to the shell 10 by way of being attached to the portal 54 which extends to each. As such, vapors which condense fall from the fraction collector to a bottom side thereof, exterior to the vertical tube 30, and into the condenser 50. Some vapors may fall back into the vertical tube but the rising heat there-from causes vapors to be condensed to fall outside of the vertical tube into a liquid where they then enter into the condenser 50. The condenser can have a water jacket which cools the liquids therein further before dropping the liquid out of a portal on an opposite side from the portal 54.

The distillation system can be used in multiple passes allowing fractional distillation of a same material multiple times, by collecting fractions and running the fractions through the system, as described above, more than one time. Any or all of the devices shown can be or are made of glass which is translucent, in embodiments of the disclosed technology.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalence of the claims are to be embraced within their scope. Combinations of any of the methods, systems, and devices described herein-above are also contemplated and within the scope of the disclosed technology.

I claim:

1. A short path distillation head comprising:
    a vertical tube with undulating side walls;
    a distillation key with undulating side walls corresponding to said undulating side walls of said vertical tube, wherein said side walls of said distillation key and said undulating side walls of said vertical tube are constructed such that a distance between said undulating side walls of each of said distillation key and vertical tube is substantially constant;
    wherein said distillation key fills a majority of a region of said vertical tube with said undulating side walls.

2. The short path distillation head of claim 1, wherein said vertical tube narrows between said undulating side walls and smooth side walls.

3. The short path distillation head of claim 2, further comprising a fraction collector surrounded by said smooth side walls.

4. The short path distillation head of claim 3, wherein a side portal opens between said fraction collector, through said smooth side walls of said fraction collector, and into a condenser.

5. The short path distillation head of claim 4, wherein a bottom side of said fraction collector is vertically aligned with and continuous with a bottom side of said side portal.

6. The short path distillation head of claim 5, wherein said vertical tube passes into and above said bottom side of said fraction collector.

7. The short path distillation head of claim 1, wherein said distillation key extends out of an area circumscribed by said vertical tube.

8. The short path distillation head of claim 7, wherein an exterior shell surrounds a majority of said vertical tube, said distillation key, and all of a fraction collector which opens into said vertical tube and through which said distillation key passes.

9. The short path distillation head of claim 8, wherein a part of said vertical tube and said distillation key extend past and outside of an area circumscribed by said exterior shell.

10. The short path distillation head of claim 9, wherein said distillation key is attached only to said fraction collector.

11. A short path distillation head comprising:
a hollow vertical tube, wherein a majority of an interior volume of said hollow vertical tube, at each cross-section of said hollow vertical tube is filled with a solid distillation key;
said solid distillation key being unattached to said vertical tube;
a fraction collector into which a lip of said hollow vertical tube passes therein;
wherein said solid distillation key and said hollow vertical tube converge to a narrower and parallel region at said fraction collector.

12. The short path distillation head of claim 11, wherein a bottom minority end of said solid distillation key is unencumbered by said vertical tube.

13. The short path distillation head of claim 12, wherein a minority end of said vertical tube is unencumbered by a glass shell.

14. The short path distillation head of claim 13, wherein said glass shell surrounds a majority of said distillation key and said vertical tube, said glass shell further comprising a curvilinear top region surrounding said fraction collector and a bellowed bottom side, opposite said top side.

15. The short path distillation head of claim 11, wherein a majority of said hollow vertical tube and said solid distillation key have corresponding undulating side walls such that said undulating side walls of said hollow vertical tube and said solid distillation key are equidistant to one another.

16. The short path distillation head of claim 15, wherein a portion of said hollow vertical tube and said solid distillation key are straight walled and a distance between straight walls of said hollow vertical tube and said solid distillation key are less than a distance between said undulating side walls of said hollow vertical tube and said solid distillation key.

17. The short path distillation head of claim 16, wherein a rejection area, in the form of a horizontal wall, is formed between said straight walls and said undulating walls of said hollow vertical tube.

18. The short path distillation head of claim 11, further comprising a side portal which has a shared bottom side thereof with said fraction collector, said side portal opening into a condenser.

19. The short path distillation head of claim 18, wherein said side portal opens adjacent to and at a same height to a vertical wall of said hollow vertical tube.

20. The short path distillation head of claim 11, wherein a flow of substantially all matter in a path from a lowermost opening into said vertical tube to a bottom side of said fraction collector is uninterrupted and passes through, in order, an undulating region and a smooth region.

* * * * *